United States Patent
Yokota et al.

(10) Patent No.: US 8,732,823 B2
(45) Date of Patent: May 20, 2014

(54) NONDESTRUCTIVE TESTING SYSTEM

(75) Inventors: Masayoshi Yokota, Tokyo (JP); Sumito Nakano, Tokyo (JP)

(73) Assignee: Olympus Corporation, Tokyo (JP)

( * ) Notice: Subject to any disclaimer, the term of this patent is extended or adjusted under 35 U.S.C. 154(b) by 246 days.

(21) Appl. No.: 12/948,842

(22) Filed: Nov. 18, 2010

(65) Prior Publication Data

US 2012/0131667 A1  May 24, 2012

(51) Int. Cl.
*G06F 21/00* (2013.01)

(52) U.S. Cl.
USPC ............. 726/21; 709/220; 709/227; 715/734; 370/254; 370/256

(58) Field of Classification Search
USPC ................... 726/21; 709/220, 227; 715/734; 370/254, 256
See application file for complete search history.

(56) References Cited

U.S. PATENT DOCUMENTS

| | | | | |
|---|---|---|---|---|
| 5,864,369 | A * | 1/1999 | Swan | 348/448 |
| 5,868,666 | A | 2/1999 | Okada et al. | |
| 7,228,188 | B1 * | 6/2007 | Aihara et al. | 700/94 |
| 2002/0087489 | A1 * | 7/2002 | Iizuka | 705/400 |
| 2003/0236446 | A1 | 12/2003 | Eino | |
| 2004/0090597 | A1 * | 5/2004 | De Haan | 352/43 |
| 2006/0284632 | A1 | 12/2006 | Braverman et al. | |
| 2008/0043775 | A1 * | 2/2008 | Fujinami et al. | 370/498 |
| 2008/0091065 | A1 | 4/2008 | Oshima et al. | |
| 2009/0013368 | A1 * | 1/2009 | Mimura et al. | 725/118 |
| 2012/0131325 | A1 | 5/2012 | Sato | |

FOREIGN PATENT DOCUMENTS

JP    2009-516844 A    4/2009

OTHER PUBLICATIONS

U.S. Appl. No. 12/952,487: Title: "Nondestructive Testing System": filed Nov. 23, 2010: First Named Inventor: Saichi Sato.
Non-Final Office Action dated Jun. 14, 2013 issued in related U.S. Appl. No. 12/952,487.

* cited by examiner

*Primary Examiner* — Kambiz Zand
*Assistant Examiner* — Sharif E Ullah
(74) *Attorney, Agent, or Firm* — Holtz, Holtz, Goodman & Chick, PC

(57) ABSTRACT

A nondestructive testing apparatus includes a display section and a storage section which stores predetermined executable functions. Each of the predetermined functions is initially set to one of a permitted state and a disabled state, and one of a display state and a non-display state on the display section. In an initial state, at least one of the predetermined functions is set to the disabled state and the non-display state. The nondestructive testing apparatus can receive permission information which unlocks at least one of the predetermined functions initially set to the disabled state so as to be set to the permitted state, and unlocks at least one of the predetermined functions initially set in the non-display state so as to be in the display state. The apparatus displays an operation icon only with respect to all of the predetermined functions set to the display state.

16 Claims, 7 Drawing Sheets

FIG. 4
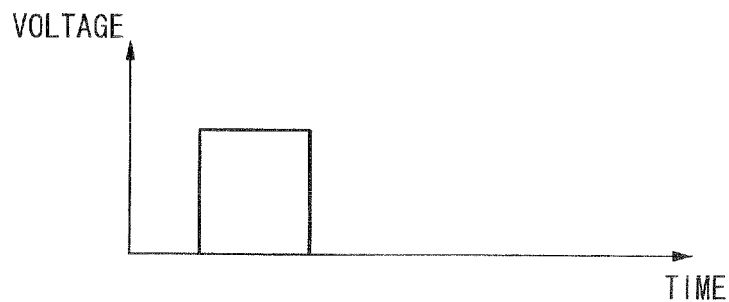
FIG. 5
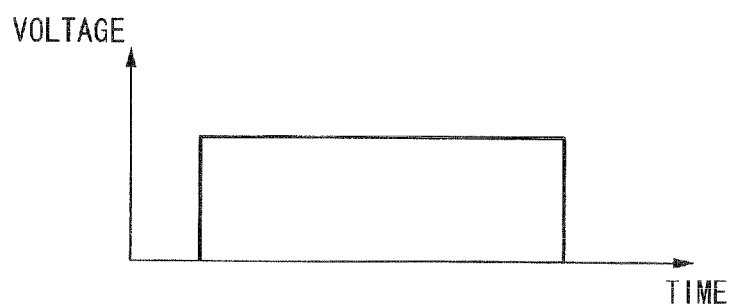
FIG. 6
| ACQUISITION PROGRAM P1 | |
|---|---|
| IDENTIFICATION PROGRAM P2 | |
| LIGHT ON/OFF PROGRAM P3 | |
| LIGHT AMOUNT INCREASE PROGRAM P4 | |
| : | |
| SUBSTRATE ID | 0 1 2 3 |

NONDESTRUCTIVE TESTING SYSTEM

BACKGROUND

1. Technical Field

The present invention relates to a nondestructive testing system that tests a subject without causing damage.

2. Related Art

Generally, in nondestructive testing systems, the number of processes in an executable range can be increased by a method of upgrading (renewing) firmware (a program) stored in the nondestructive testing systems.

For example, in a configuration method of an apparatus disclosed in PCT Japanese Translation Patent Publication No. 2009-516844, at least a part of the data for upgrading the apparatus is provided by an insert such as a memory card which is removable from the apparatus.

Such an insert stores installation data to efficiently upgrade the apparatus, application and user data, a program that in effect controls the apparatus, and a shutdown command to terminate the installation.

By connecting the insert to the apparatus, first an application is executed in the apparatus, and the application and user data stored in the insert is copied to a memory of the apparatus.

Then, by executing the shutdown command, the upgrade of the apparatus is terminated.

Further, in recent years, in digital cameras and the like, it has been possible to download the program for the upgrade of the firmware through the Internet.

By installing the downloaded program in the digital camera, the digital camera is able to execute a new function such as white balance correction or noise reduction.

For example, previously, in digital cameras, it had been difficult to perform processing on photographic images during and after photographing. However, by installing a program for upgrade, it is possible to execute a new function such as white balance correction or noise reduction.

SUMMARY

According to an embodiment of the invention, a nondestructive testing apparatus includes a display section and a storage section which stores a plurality of predetermined functions which are executable by the nondestructive testing apparatus, wherein (i) each of the predetermined functions is initially set to one of a permitted state and a disabled state, and (ii) each of the predetermined functions is initially set to one of a display state and a non-display state on the display section. In an initial state, at least one of the predetermined functions is set to the disabled state and the non-display state. In addition, the nondestructive testing apparatus includes a control section which is adapted to receive permission information including information which: (i) unlocks at least one of the predetermined functions initially set to the disabled state so as to be set to the permitted state, and (ii) unlocks at least one of the predetermined functions initially set in the non-display state so as to be in the display state, and the control section controls the display section to display an operation icon only with respect to all of the predetermined functions which are set to the display state.

BRIEF DESCRIPTION OF THE DRAWINGS

FIG. 4 is a diagram illustrating a waveform of a signal generated when performing a normal pushing operation on a joystick or the like of the operation section.

FIG. 5 is a diagram illustrating a waveform of a signal generated when performing a long pushing operation on the joystick or the like of the operation section.

FIG. 6 is a diagram illustrating a program and a substrate ID stored in a ROM of the endoscope apparatus.

DESCRIPTION OF EXEMPLARY EMBODIMENTS

Hereinafter, a nondestructive testing system according to a first embodiment of the invention will be described with reference to FIGS. 1 to 13.

The following description will be given of an example of a case in which the nondestructive testing system comprises an endoscope apparatus.

The endoscope apparatus, for example, tests an inner cavity of a subject such as a tubular object by using an image capturing unit or the like.

Figure 1:
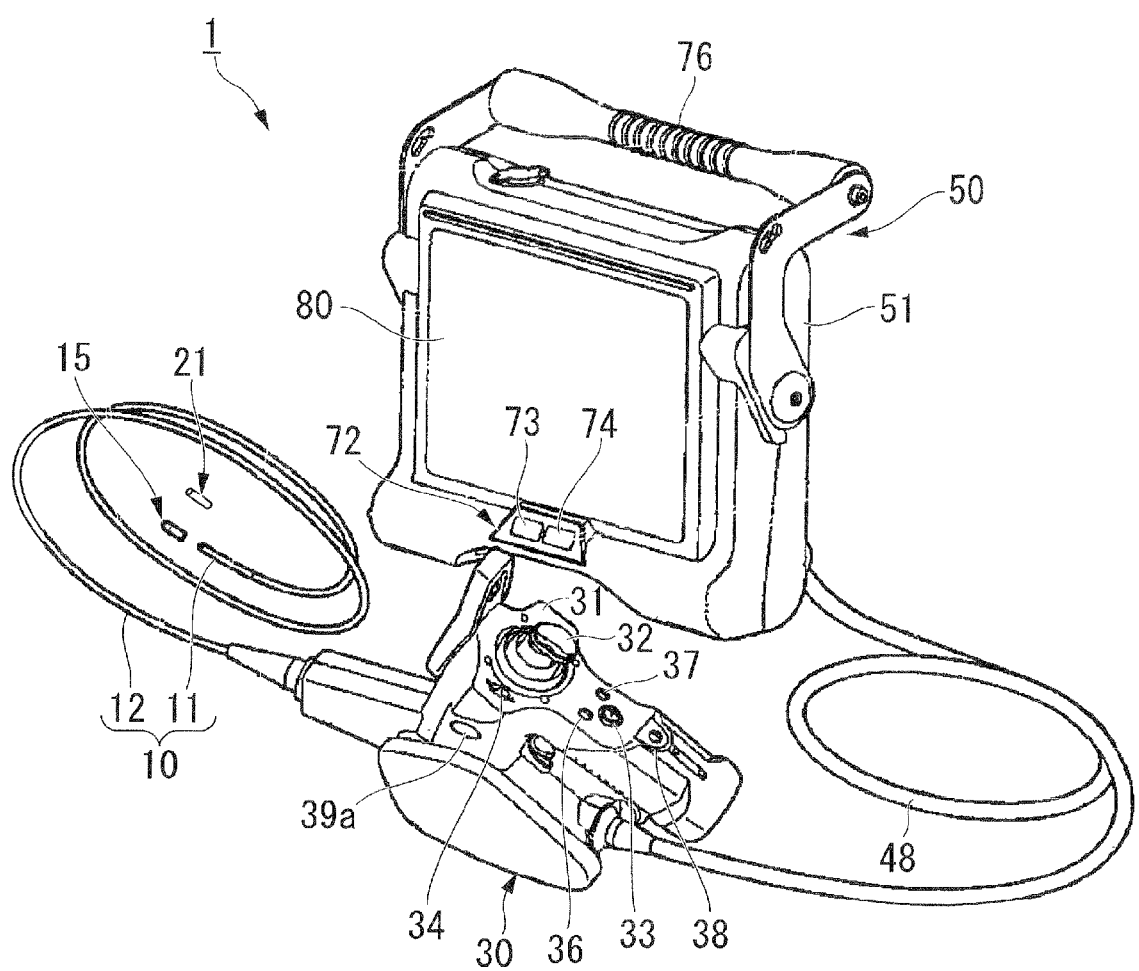
FIG. 1 is an overall view of an endoscope apparatus according to an embodiment of the invention.
Figure 2:
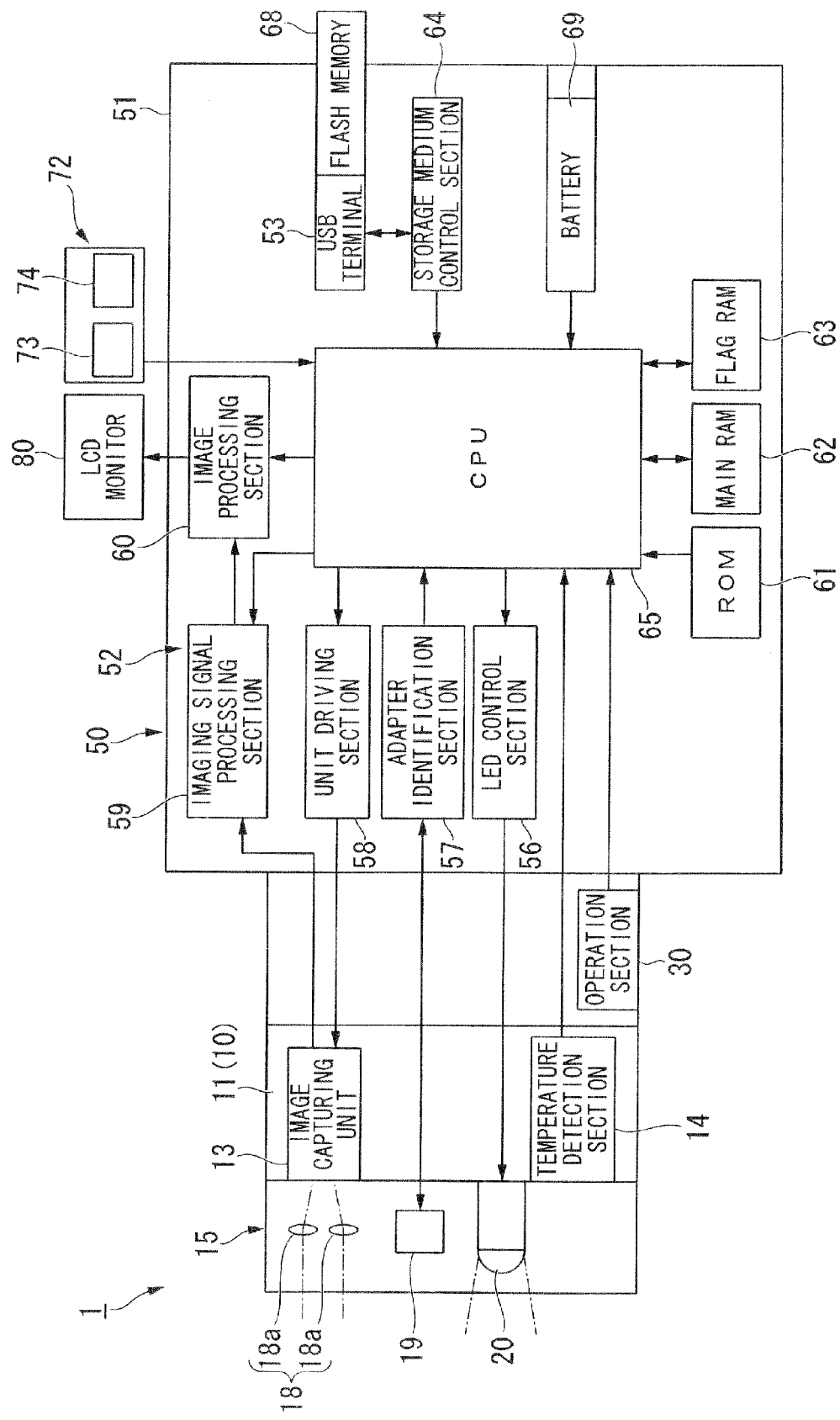
FIG. 2 is a block diagram of the endoscope apparatus.

As shown in FIGS. 1 and 2, an endoscope apparatus 1 according to the present embodiment of the invention includes: an insertion section (a testing section) 10 which has a long length; an operation section 30 which is connected to the proximal end of the insertion section 10; a main body unit 50 which is connected to the operation section 30 through a universal cable 48; and an LCD monitor (a display section) 80 which is disposed on the side of the main body unit 50.

The insertion section 10 comprises a bending portion 11 which is disposed on the distal end thereof and is configured to be bent, and a flexible tube portion 12 which is connected to the base end of the bending portion (a main body) 11.

The bending portion 11 is configured to bend in an arbitrary direction with respect to an axial line of the insertion section 10 by operating the operation section 30.

An image capturing unit 13, which comprises a CCD (not shown), and a temperature detection section 14 which detects the temperature of the distal end of the insertion section at its own position, is disposed on the tip end surface of the bending portion 11 at the distal end of the insertion section, as shown in FIG. 2.

The image capturing unit 13 captures an image of light incident on the imaging surface of the CCD, and is able to provide an output as an image or a dynamic image (subject information).

A direct viewing adapter 15 capable of observing the front side thereof is threadably and detachably mounted in the insertion section 10 (at the tip end of the bending portion 11).

The adapter 15 shown in FIG. 2 is an adapter for stereo measurement, and houses a stereo optical system including a lens unit 18 formed of two lens groups 18a, an electric resistor 19, and an LED 20.

The two lens groups 18a are arranged in a direction orthogonal to the axial line of the adapter 15 which has a substantially cylindrical shape.

Each lens group 18a is disposed so that the focus of the lens group 18a is positioned on the imaging surface of the CCD of the image capturing unit 13 when the adapter 15 is connected to the insertion section 10.

In addition, the endoscope apparatus 1 has a typical zoom function of enlarging and reducing the image acquired by the image capturing unit 13.

Moreover, when the adapter 15 is connected to the insertion section 10, an electric resistor 19 and an LED 20 are electrically connected to the main body unit 50, and the LED 20 is tightly attached to the temperature detection section 14. Thus, it is possible to detect the temperature of the LED 20.

As shown in FIG. 1, the endoscope apparatus 1 includes not only the adapter 15 for stereo measurement, but also a side-viewing adapter 21.

The side-viewing adapter 21 can be replaced with the adapter 15 so as to be connected to the insertion section 10.

The adapter 21 also includes an electric resistor (not shown), similarly to the above-described adapter 15.

The resistance value of the electric resistor of the side-viewing adapter 21 is set to be different from the resistance value of the electric resistor 19 of the adapter 15.

Figure 3:
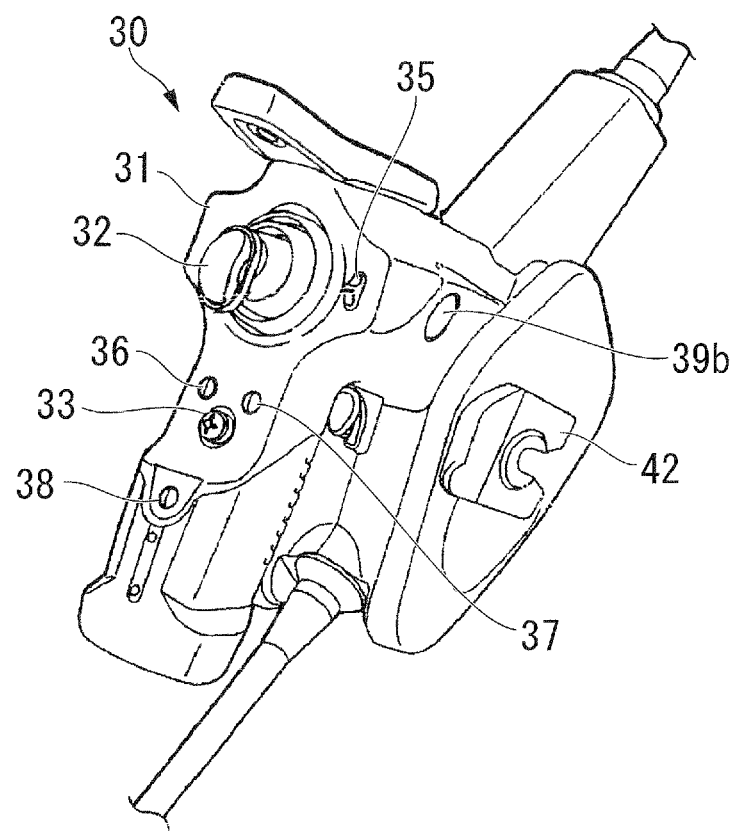
FIG. 3 is a perspective view of an operation section of the endoscope apparatus.

The operation section 30 includes, as shown in FIGS. 1 to 3: two joysticks 32 and 33; two levers 34 and 35; and three buttons 36, 37, and 38 which are arranged on the surface of an operation section main body 31. In addition, the operation section also includes buttons 39a and 39b disposed on the sides of the operation section main body 31 (hereinafter, the joystick 32 to the button 39b are referred to as "joystick 32 or the like").

The top end sides of joysticks 32 and 33 can be pivoted centering on the base ends thereof (the end portion close to the operation section main body 31).

The levers 34 and 35 are slidable in one direction (the distal/proximal end side direction) along the upper surface of the operation section main body 31.

Each of the joysticks 32 and 33 has at least one set of electric contacts, which are not shown, disposed therein.

An operator operates the joystick 32 or the like, and thereby it is possible to generate a signal waveform in which the time of shorting the one set of electric contacts is comparatively short, as shown in FIG. 4. If the time of short circuit is, for example, less than one second, the operation of the joystick 32 or the like are referred to as a "normal pushing".

In addition, when the operator operates the joystick 32 or the like, it is possible to generate a signal waveform in which the time of shorting the one set of electric contacts is comparatively long, as shown in FIG. 5. If the time of short circuit is, for example, greater than or equal to two seconds, the operation of the joystick 32 or the like is referred to as a "long pushing".

As the operator moves the top end side of the joystick 32, the bending portion 11 is bent.

The functions of the joystick 33, the levers 34 and 35, and the buttons 36, 37, 38, 39a, and 39b will be described later.

Further, as shown in FIG. 3, the operation section main body 31 is equipped with a hanger 42 for hanging the operation section 30 on the main body unit 50.

As shown in FIGS. 1 and 2, the main body unit 50 has a casing 51 which has a substantially box shape, and a control section 52 and a USB terminal 53 which are disposed in the casing 51.

As shown in FIG. 2, the control section 52 includes: an LED control section 56; an adapter identification section (an identification section) 57; a unit driving section 58; an imaging signal processing section 59; an image processing section 60; a ROM (a program storage section) 61; a main RAM (an information storage section) 62; a flag RAM 63; a storage medium control section 64; and a CPU (a calculation section) 65.

The LED control section 56 controls a voltage applied to the LED 20.

The adapter identification section 57 applies a certain voltage to the electric resistor of the adapter connected to the insertion section 10, and at this time, detects the value of the current flowing to the electric resistor. In this way, the adapter identification section 57 is capable of detecting the type (condition information) of the adapter connected to the insertion section 10.

The unit driving section 58 supplies the predetermined electric power to the image capturing unit 13, and controls the image capturing unit 13.

The imaging signal processing section 59 is able to calculate a distance from the tip end of the adapter 15 to the subject based on a deviation between images of the subject formed by the two lens groups 18a in one picture image by stereo measurement using the adapter 15.

Further, the imaging signal processing section 59 is provided with an adjustment tool (not shown), and is thus able to adjust ranges of dynamic range values and gain values of the image and the dynamic image acquired by the image capturing unit 13 in a predetermined range.

The image processing section 60 is able to create an image which is obtained by superimposing additional information, such as the type of adapter and the distance to the subject, upon the image acquired by the image capturing unit 13.

The ROM 61 stores a plurality of programs which comprise firmware such that the programs are not removable or erasable by a user.

As shown in FIG. 6, the ROM 61 stores program codes such as an acquisition program (a first program) P1 that controls the image capturing unit 13 and the imaging signal processing section 59, an identification program (a second program) P2 that controls the adapter identification section 57, a light on/off program P3 to be described later, and a light amount increase program P4.

Further, in order to distinguish the control section 52 of the endoscope apparatus 1 from the control section of a different endoscope apparatus 1, the ROM 61 stores a different substrate ID unique to the endoscope apparatus 1. The substrate ID is a unique identification symbol, which is different for each machine even if the type of each endoscope apparatus 1 is the same.

The main RAM 62 and the flag RAM 63 of the embodiment employ non-volatile memory units which are rewritable.

When the endoscope apparatus 1 is activated, the main RAM 62 temporarily stores the above-mentioned programs P1 to P4, and stores the image or the like acquired by the image capturing unit 13.

Figure 7:
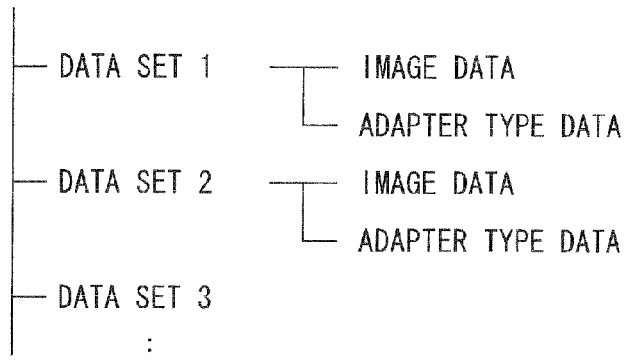
FIG. 7 is a diagram illustrating a configuration of data of a data set stored in a main RAM of the endoscope apparatus.

The plurality of image data acquired by the image capturing unit 13 and the plurality of adapter type data acquired by the adapter identification section 57 are stored in the main RAM 62 in a state where the respective data are associated with each other as shown in FIG. 7.

The respective image data is stored in the main RAM 62 as a data unit of a data set which is a set formed of the image data and the type data of the corresponding adapter.

Here, the above-mentioned corresponding data means the type data of the adapter at the time of acquiring the image data or the type data, which is detected before the acquisition of the image data, of the adapter connected to the insertion section 10.

Figure 8:
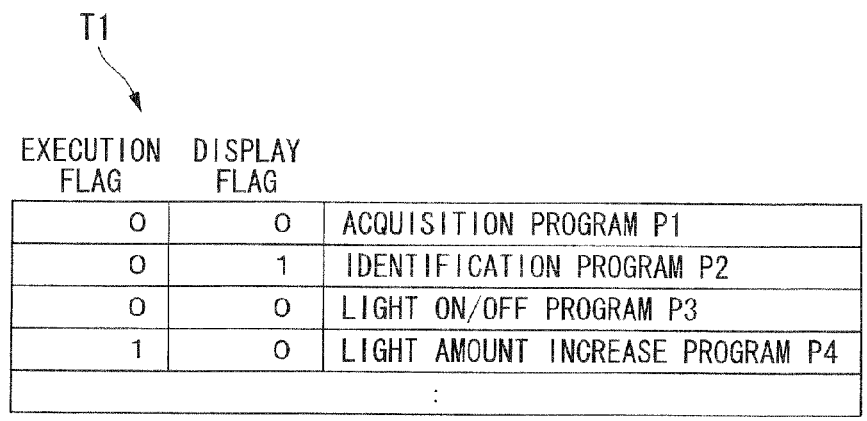
FIG. 8 is a diagram illustrating a table stored in a flag RAM of the endoscope apparatus.

As shown in FIG. 8, the flag RAM 63 stores a table T1 which has set values of execution flags representing whether or not execution of each program stored in the ROM 61 is restricted, and set values of the display flags representing whether or not display of the data acquired by the program on the display screen of the LCD monitor 80 is restricted.

The program of which the execution flag is "0" is in an execution permission state where the execution thereof is permitted. In addition, the program of which the execution flag is "1" is in an execution restriction state where the execution thereof is restricted.

The program of which the display flag is "0" is in a display permission state where the display on the LCD monitor 80 is permitted. In addition, the program of which the display flag is "1" is in a display restriction state where the display on the LCD monitor 80 is restricted.

In such a manner, in the flag RAM 63, by switching values of the flags between "0" and "1", it is possible to set each corresponding program to any one of the execution permission state and the execution restriction state and any one of the display permission state and the display restriction state.

In addition, the values of the flags in the table T1 of FIG. 8 are values set in a shipping state (an initial state) of the endoscope apparatus 1.

That is, in the shipping state, among the programs P1 to P4, the acquisition program P1, the identification program P2, and the light on/off program P3 are set to the execution permission state where the execution thereof is permitted. In addition, the light amount increase program P4 is set to the execution restriction state where the execution thereof is restricted.

On the other hand, the acquisition program P1, the light on/off program P3, and the light amount increase program P4 are set to the display permission state where the display on the LCD monitor 80 is permitted. In addition, the identification program P2 is set to the display restriction state where the display on the LCD monitor 80 is restricted.

As shown in FIG. 2, the storage medium control section 64 is connected with the USB terminal 53.

The storage medium control section 64 is able to read the data stored in the flash memory (the storage medium) 68 or the like detachably connected to the USB terminal 53. While a USB terminal is used in the present embodiment, it should be recognized that one having ordinary skill in the art may alternately employ various different connection devices, such as a serial port, optical drive, floppy drive, network port (i.e. Ethernet), and the like. Wireless connections are also understood to fall within the scope of the present invention.

Figure 9:
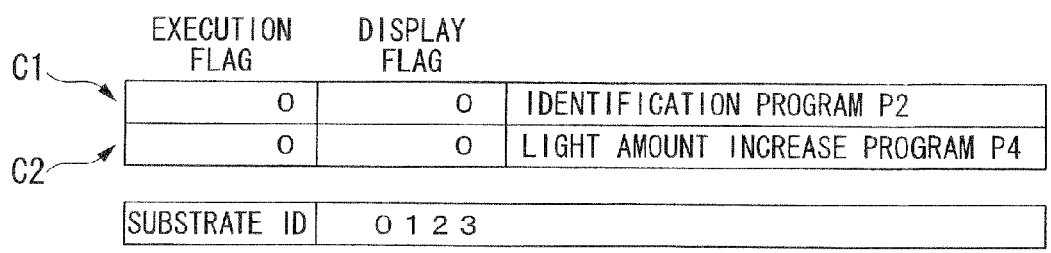
FIG. 9 is a diagram illustrating data stored in a flash memory of the endoscope apparatus.

As shown in FIG. 9, the flash memory 68 of the present embodiment stores a display permission command C1 which switches an identification program P2 from the display restriction state to the display permission state, an execution permission command C2 which switches a light amount increase program P4 from the execution restriction state to the execution permission state, and the substrate IDs.

The display permission command C1 includes the values of the display flag and the execution flag in which "0" is noted and the "identification program P2" as a name of the program which is switched to the display permission state.

The execution permission command C2 includes the values of the display flag and the execution flag in which "0" is noted and the "light amount increase program P4" as a name of the program which is switched to the execution permission state.

The CPU 65 is, as shown in FIG. 2, electrically connected with the LED control section 56, the unit driving section 58, the imaging signal processing section 59, (which are hereinafter referred to as the "LED control section 56 or the like"), the adapter identification section 57, the ROM 61, the main RAM 62, the flag RAM 63, and the storage medium control section 64.

The CPU 65 reads the data from the ROM 61, controls the LED control section 56 or the like, and reads and writes data from and in the main RAM 62 and the flag RAM 63.

The CPU 65 reads the values of the flags representing classification of the execution permission state/execution restriction state and the display permission state/display restriction state recorded in the table T1 of the flag RAM 63. Based on the read flag values, the CPU executes the programs which are set to the execution permission state, and displays the data or the like acquired by the programs, which are set to the display permission state, on the LCD monitor 80.

A battery 69 is configured to be detachable from the casing 51, and supplies electric power to the LED control section 56, the unit driving section 58, the CPU 65, the LCD monitor 80, and the like.

As shown in FIGS. 1 and 2, the LCD monitor 80 is disposed on the side of the casing 51, and is connected to the above-mentioned image processing section 60.

As described later, when the endoscope apparatus 1 is activated and a certain time necessary to initialize the apparatus has passed, the control section 52 activates a LIVE mode, thereby displaying the dynamic image and the like, which are captured by the image capturing unit 13, on a display screen of the LCD monitor 80.

A front panel 72 is mounted on the portion adjacent to the LCD monitor 80 on the side of the casing 51.

A power supply button 74 and a LIGHT button 73 changing the voltage applied to the LED 20 are disposed in the front panel 72.

Further, on the outer surface of the casing 51, there is provided a handle 76 for moving the main body unit 50 (refer to FIG. 1), and a hanger receiving portion (not shown) for hanging the operation section 30 on the main body unit 50 by engaging with the hanger 42 of the operation section 30.

The above-mentioned joystick 33, the levers 34 and 35, and the buttons 36, 37, 38, 39a, and 39b will be described one after another.

As shown in FIGS. 1 and 3, the button 36 is disposed on the left lower side of the joystick 32 which is disposed at substantially a center of the surface of the operation section main body 31. The button 36 is also called a MENU/EXIT button.

When the control section 52 keeps the LIVE mode active, if the operator performs the normal pushing operation on the button 36, then the control section 52 switches the mode to a MENU mode for performing various settings.

In this state, the operator further performs the normal pushing operation on the button 36, and thus the control section 52 switches the mode to the LIVE mode again.

The button 37 is disposed on the right lower side of the joystick 32, and is also called a LIVE/GAIN button.

When the control section 52 keeps the MENU mode active, if the operator performs the normal pushing operation on the button 37, then the control section 52 switches the mode to the LIVE mode.

At this time, whenever the operator performs the long pushing operation on the button 37, the setting condition of the gain value is alternately switched between an automatic mode and a manual mode.

In addition, when the control section 52 keeps the LIVE mode active, if the operator performs the normal pushing operation on the button 37, then the predetermined program is executed, thereby automatically adjusting the gain value and automatically adjusting the range of the dynamic range value.

The function of making the range of the dynamic range value adjustable is hereinafter referred to as a "WiDER function".

However, in the shipping state, the program for making the dynamic range value adjustable is set to the execution restriction state by the flag RAM 63 so as not to execute the WiDER function.

As shown in FIGS. 1 and 3, the joystick 33 is disposed on the lower side of the buttons 36 and 37 on the surface of the operation section main body 31, and is called a MEAS(MEASURE)/ENTER button.

In the MENU mode, the operator is able to select a menu by moving the top end side of the joystick 33, and thus it is possible to determine the selected menu by pushing the joystick 33 into the operation section main body 31 side.

The buttons 39a and 39b are called FRZ (FREEZE)/REC buttons.

The operator may push any of the buttons 39a and 39b, and thereby it is possible to store the image, which is acquired by the image capturing unit 13, in the main RAM 62.

The button 38, which is disposed on the lower side of the joystick 33, is called a VIEW button.

By pushing the button 38, the operator is able to allow the display screen of the LCD monitor 80 to display a list of the images stored in the main RAM 62 in a reduced manner or to display the stored images.

The lever 34 is disposed on the left side of the joystick 32, and is called a BRT lever.

When the LIVE mode is active, if the operator slides the lever 34 frontward, the brightness of the entire display screen of the LCD monitor 80 is increased.

When the LIVE mode is active, if the operator slides the lever 34 rearward, the brightness of the entire display screen of the LCD monitor 80 is decreased.

Figure 10:
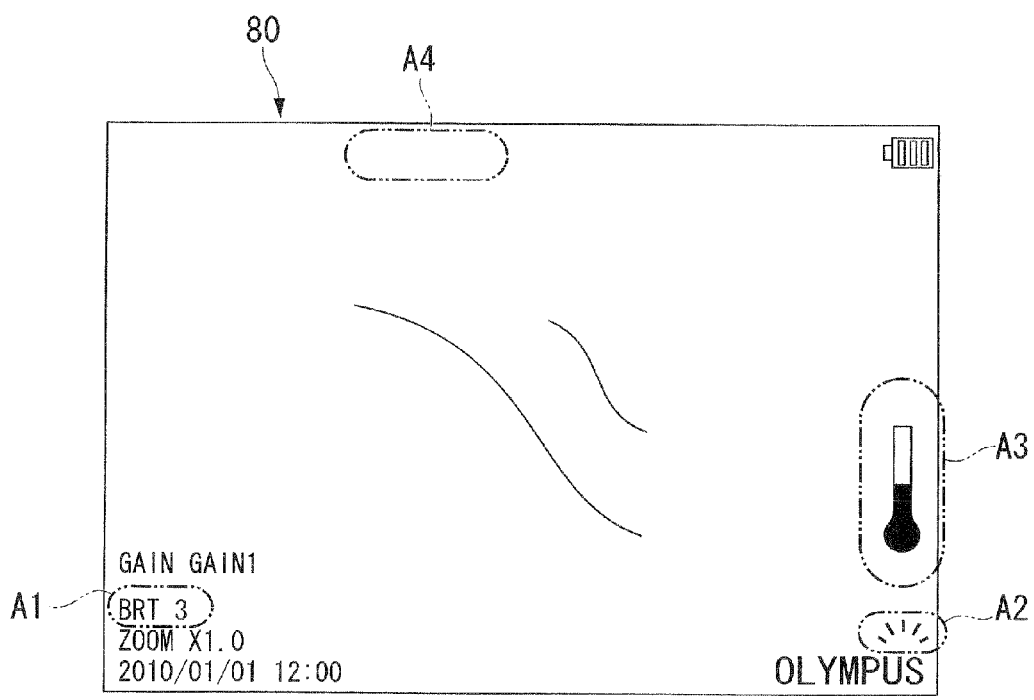
FIG. 10 is a diagram illustrating a content displayed on a LCD monitor of the endoscope apparatus.

In addition, if the operator adjusts the brightness of the LCD monitor 80 by using the lever 34, as shown in FIG. 10, the currently set brightness is displayed in an area A1 on the lower left side of the display screen of the LCD monitor 80 for a predetermined time (for example, in FIG. 10, brightness BRT is set to 3). It is recognized that the area A1 may be alternately displayed in an area other than the lower left side of the display screen of the LCD monitor 80.

The lever 35 is, as shown in FIG. 3, disposed on the right side of the joystick 32, and is referred to as a ZOOM lever.

When the control section 52 keeps the LIVE mode active, if the operator slides the lever 35 frontward or rearward, a predetermined program is executed. By using the above-mentioned zoom function, it is possible to enlarge and reduce the image which is acquired by the image capturing unit 13.

In addition, as the operator slides the lever 35, the predetermined program corresponding thereto is executed. While the operator slides the lever 35, the imaging signal processing section 59 continuously performs the stereo measurement. Thereby, the distances to the distance measurement positions, which are set ahead of the adapter 15, are sequentially displayed on the display screen of the LCD monitor 80.

The function of sequentially displaying the measured distances is hereinafter referred to as a "real-time distance measurement function".

However, in the shipping state, the program is set to the execution restriction state by the flag RAM 63 so as not to execute the real-time distance measurement function.

Subsequently, description will be given of a LIGHT button 73 and a power supply button 74 disposed on the front panel 72 of the main body unit 50.

Each of the LIGHT button 73 and the power supply button 74 is provided with a respective set of electric contacts (not shown).

As the operator performs the normal pushing operation on the power supply button 74, it is possible to alternately switch between an inactivation state, in which electric power supply from the battery 69 is stopped, and an activation state, in which electric power is supplied from the battery 69 to the LED control section 56, the CPU 65, and the like, thereby activating the endoscope apparatus 1.

As the operator performs the normal pushing operation on the LIGHT button 73, the light on/off program P3 shown in FIG. 8 is executed.

The light on/off program P3 is able to alternately switch between the light-off state, in which the LED 20 is turned off, and the normal light-on state, in which the LED 20 is turned on, by driving the LED control section 56.

In addition, when the LED 20 is turned on, if the operator performs the long pushing operation on the LIGHT button 73, then the light amount increase program P4 shown in FIG. 8 is executed.

The light amount increase program P4 puts the LED 20 into a high-intensity light-on state where the amount of the light irradiated from the LED 20 is increased by allowing the LED control section 56 to apply a voltage which is higher than that in the normal light-on state of the LED 20.

Further, in the high-intensity light-on state, the operator performs the long pushing operation on the LIGHT button 73, the LED 20 returns to the normal light-on state.

In addition, hereinafter, the function of increasing the light amount of the LED 20 is referred to as a "high beam function."

In the shipping state, the light amount increase program P4 is set to the execution restriction state by the flag RAM 63 so as not to execute the high beam function.

Further, when the light amount increase program P4 puts the LED 20 into the high-intensity light-on state, as shown in FIG. 10, an icon is displayed in and area A2 on the lower right side of the display screen of the LCD monitor 80 during a predetermined amount of time. The area A2 may also be provided on a different area of the LCD monitor 80.

Additionally, in the shipping state the light amount increase program P4 is set to the display permission state, as illustrated in FIG. 8. Therefore, display of the icon on the display screen of the LCD monitor 80 is not restricted.

The temperature condition (change) detected by the temperature detection section 14 is displayed in an area A3 above the area A2 on the display screen of the LCD monitor 80 by using an operation icon having substantially a thermometer shape. It is noted that the area A3 may be provided elsewhere on the LCD monitor 80. In addition, it should be recognized that not only a thermometer shape may be used for the operation icon representing the temperature detection section, but any other appropriately shaped icon may be provided. In the present invention, the operation icon is not limited to pictures, and as used herein the term operation icon can alternately refer to characters, words, or symbols, in addition to pictorial icons.

In addition, the temperature, which is detected by the temperature detection section 14, may be higher than a predetermined temperature set in advance. In this case, in order to promote awareness, the program for displaying a warning message on the center portion of the LCD monitor 80 is stored in the ROM 61. However, in the shipping state, the program is set to the execution restriction state and the display restriction state, and thus the warning message is not displayed.

The function of displaying the message is hereinafter referred to as a "temperature alert function".

The acquisition program P1 is, in the shipping state, set to the execution permission state and the display permission state, as shown in FIG. 8. Hence, the image or the dynamic image acquired by the above-mentioned acquisition program P1 is displayed on the central portion of the display screen of the LCD monitor 80 without the restriction of the flag RAM 63, and may alternately be provided on a different area of the LCD monitor 80.

The identification program P2 is set to the display restriction state after shipment, but is set to the execution permission state. Therefore, the identification program P2 is executed all the time, and thus the type of the adapter is always detected. The type of the adapter detected by the identification program P2 is set to be displayed in an area A4 on an upper side of the display screen of the LCD monitor 80, as shown in FIG. 10, but may also be provided elsewhere on the LCD monitor 80. However, in the shipping state, the identification program P2 in the embodiment is set to the display restriction state, and thus the type of the adapter is not displayed in the area A4.

The function of displaying the type of the adapter is hereinafter referred to as an "adapter type display function".

As described above, in the shipping states of five functions of the temperature alert function, the adapter type display function, the high beam function, the WiDER function, and the real-time distance measurement function (hereinafter referred to as the "temperature alert function or the like"), the adapter type display function is set to the execution permission state and the display restriction state. For this reason, the function can be executed but is not displayed on the LCD monitor 80.

On the other hand, the temperature alert function, the high beam function, the WiDER function, and the real-time distance measurement function may be set to the execution restriction state and the display restriction state. In this case, the programs are not executed and the execution results thereof are not displayed on the LCD monitor 80.

Next, description will be given of a method of testing an inner cavity of a subject by using the endoscope system 1 configured as described above.

In addition, in the following description, since the flash memory 68 is provided from the manufacturer of the endoscope system 1 in accordance with the demand of the operator, it is assumed that originally the flash memory 68 is not provided to the endoscope system 1.

In the case of the endoscope apparatus 1 which is set to the shipping state, the operator selects an adapter depending on the subject, and for example, connects the adapter 15 to the insertion section 10.

If the operator performs the normal pushing operation on the power supply button 74, electric power is supplied from the battery 69 to the LED control section 56, the CPU 65, and the like, and the endoscope apparatus 1 becomes activated.

The CPU 65 reads the programs P1 to P4 and the substrate ID which are stored in the ROM 61 and the table T1 which is stored in the flag RAM 63, and retains those in the main RAM 62.

The CPU 65 checks whether or not it is possible to execute not only the adapter type display function but also for example the temperature alert function or the like, based on the settings of the execution permission state/execution restriction state and the display permission state/display restriction state of each program P1 to P4 recorded in the table T1.

Additionally, in this example, the adapter type display function is executed, but the execution result thereof is not displayed on the LCD monitor 80. Hence, the temperature alert function, the high beam function, the WiDER function, and the real-time distance measurement function are not executed and not displayed on the LCD monitor 80.

As described above, when the initialization of the control section 52 is terminated, the control section 52 activates the LIVE mode. Then, the dynamic image, which is acquired by the image capturing unit 13, is processed through the imaging signal processing section 59 and the image processing section 60, and is thus displayed on the LCD monitor 80.

The CPU 65 detects the type of the adapter by using the adapter identification section 57 at predetermined time intervals, and stores the detection result (the type of the adapter which is currently used) of the type of the adapter, which is connected to the insertion section 10, in the main RAM 62. In addition, the CPU detects the temperature of the LED 20 by using the temperature detection section 14, stores the detection result (the temperature of the distal end of the insertion section which is currently used) of the temperature in the main RAM 62, and displays the detection result on the LCD monitor 80.

However, since the adapter type display function is set to the display restriction state, the type of the detected adapter is not displayed on the LCD monitor 80.

The operator puts the LED 20 into the normal light-on state by performing the normal pushing on the LIGHT button 73, and inserts the insertion section 10 into the inner cavity of the subject while bending the bending portion 11 by using the joystick 32 of the operation section 30.

Adjustment for making the entire display screen of the LCD monitor 80 brighter or darker is achieved by sliding the lever 34 (the BRT lever).

In addition, adjustment for enlarging or reducing the dynamic image displayed on the LCD monitor 80 is achieved by the lever 35 (the ZOOM lever).

In addition, an image of the inner cavity of the subject is acquired from a desired position by pushing the button 39a (the FRZ/REC button), and this image is stored in the main RAM 62.

At this time, as shown in FIG. 7, the image data and the type data (the type data of the adapter which is used at the time of acquiring the image data) detected before the acquisition of the image data are associated with each other as a data set, and are stored in the main RAM 62.

The operator may exchange the adapter, which is connected to the bending portion 11, for example from the adapter 15 to the adapter 21 as need arises. In this case, the CPU 65 detects the exchange of the adapter, and after the exchange, records the type of the adapter 15 in the main RAM 62 at the predetermined time intervals.

Figure 11:
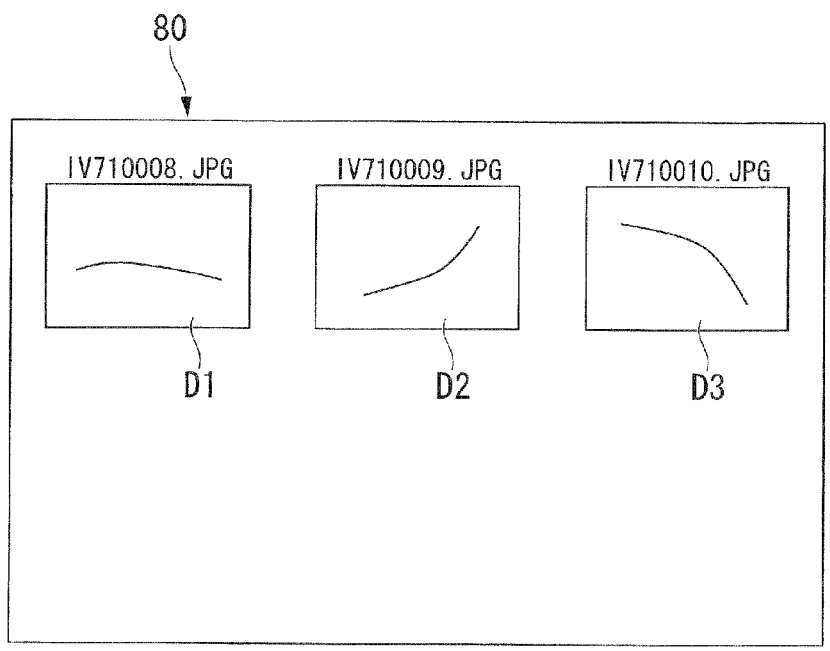
FIG. 11 is a diagram illustrating an image which is displayed on the LCD monitor in a reduced manner.

After the image data is stored several times, the operator may press the button 38 (VIEW button). In this case, as shown in FIG. 11, the list of the images D1 to D3 recorded in the main RAM 62 is displayed on the display screen of the LCD monitor 80 in a reduced manner.

Figure 12:
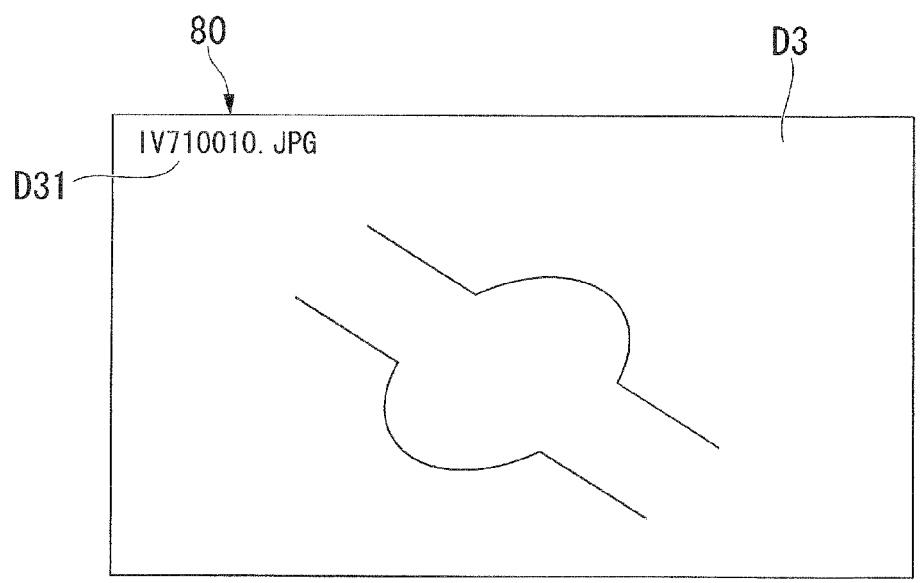
FIG. 12 is a diagram illustrating an image which is displayed on the LCD monitor.

At this time, the operator may press the button 38 by selecting the image D3 which is displayed in a reduced manner with the aid of the joystick 33. In this case, as shown in FIG. 12, the image D3 is displayed on the central portion of the display screen of the LCD monitor 80, and a file name D31 corresponding to the image D3 is displayed on the upper side of the display screen of the LCD monitor 80.

In such a manner, after observing the inner cavity of the subject and acquiring the desired image data, the operator pulls out the insertion section 10 from the subject.

Next, description will be given of a procedure capable of displaying the type of the adapter on the display screen of the LCD monitor 80 by use of the adapter type display function and adjusting the LED 20 to the high-intensity light-on state by use of the high beam function.

First, the operator requests the flash memory 68 to add the adapter type display function and the high beam function to the endoscope apparatus 1 from the manufacturer of the endoscope apparatus 1.

The manufacturer sends, to the operator, the flash memory 68 which stores the data of the unique substrate ID of the endoscope apparatus 1 used by the operator and the display permission command C1 and the execution permission command C2 shown in FIG. 9.

At this time, the manufacturer may send, together with the flash memory 68, an indicator such as an identification seal representing that the functions added to the endoscope apparatus 1 are the adapter type display function and the high beam function, and may recommend an operator to attach the identification seal to the endoscope apparatus 1 to which the function is added.

If the operator connects the flash memory 68 sent from the manufacturer to the USB terminal 53, the CPU 65 reads the data of the substrate ID of the endoscope apparatus 1 used by the operator and the display permission command C1 and the execution permission command C2 of the flash memory 68 through the storage medium control section 64.

In addition, the CPU 65 checks that the substrate ID stored in the flash memory 68 is the same as the substrate ID stored in the ROM 61. Then, the CPU executes the display permission command C1 to write "0" into the values of the execution flag and the display flag corresponding to the identification program P2 in the table T1 of the flag RAM 63 shown in FIG. 8. In addition, the CPU executes the execution permission command C2 to write "0" into the values of the execution flag and the display flag corresponding to the light amount increase program P4 in the table.

As a result, in the endoscope apparatus 1 upgraded by the operator, the identification program P2 is switched to the display permission state, and the light amount increase program P4 is switched to the execution permission state.

At this time, the CPU 65 detects that the display on the LCD monitor 80 can be performed by the adapter type display function and the high beam function can be executed, based on the setting condition of the permission/restriction state recorded in the table T1.

In addition, if the substrate ID stored in the flash memory 68 is different from the unique substrate ID of the endoscope apparatus 1 stored in the ROM 61, the CPU 65 does not execute the display permission command C1 and the execution permission command C2.

Figure 13:
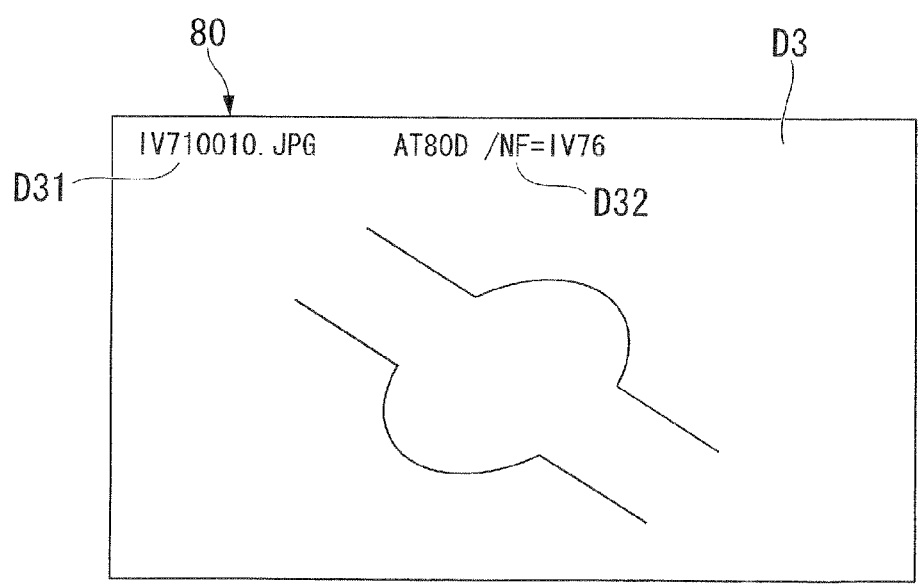
FIG. 13 is a diagram illustrating an image which is displayed on the LCD monitor when an identification program of the endoscope apparatus is set to the display permission state.

When the adapter type display function is added, if the operator operates the button 38 and the joystick 33, the image D3 is displayed on the display screen of the LCD monitor 80. Then, as shown in FIG. 13, in addition to the file name D31 of the image D3, the adapter type D32 retained together with the image D3 as a data set is displayed on the upper side of the display screen of the LCD monitor 80.

That is, the image data, which is acquired when the identification program P2 is in the display restriction state, and the adapter type data are recorded as the data set. Therefore, similarly to the image data which is acquired after the identification program P2 is set to the display permission state, the adapter type is displayed on the LCD monitor 80.

Further, when the high beam function is added, if the LED 20 is in the normal light-on state, by allowing the operator to perform the long pushing on the LIGHT button 73, it is possible to achieve the high-intensity light-on state in which the amount of the light irradiated from the LED 20 is increased.

Typically, digital cameras and the like are able to execute a new function by installing a program. However, for example, the new function may be to add certain information to a photographic image. In this case, if data of the image which is photographed before and after the activation of the new function is intended to be sorted based on the added information, the following problems arise.

That is, in the photographed image data, there is data to which the information is added and data to which the information is not added. Thus, it is difficult to uniformly sort all the image data based on the information.

Hence, even if the new function is added, some image data, which is hard to be uniformly sorted, is generated in the information added to the image data.

According to the endoscope apparatus 1 of the embodiment, in the shipping state, in the acquisition program P1 and the identification program P2 stored in the ROM 61, the identification program P2 is set to the execution permission state and the display restriction state by using the flag RAM 63.

Hence, even when the type of the adapter is not displayed on the display screen of the LCD monitor 80, the identification program P2 detects the type of the adapter at the predetermined time intervals and records the type in the main RAM 62, thereby storing the acquired image data in association with the type of the adapter.

Accordingly, by switching the identification program P2 from the display restriction state to the display permission state, it is possible to display the types of the adapters relating to all the image data on the display screen of the LCD monitor 80, regardless of the display state of the identification program P2 at the time of acquiring the image data. Thereby, it is possible to uniformly sort all the image data in accordance with the type of the adapter.

Further, the image data is acquired by the acquisition program P1, and the type of the adapter is detected by the identification program P2, thereby storing the image data and the type of the adapter in association with each other.

Hence, the operator is able to recognize the type of the adapter used at the time of acquiring the image data, together with the image data which is acquired before the display permission state of the identification program P2, by displaying the type of the adapter on the display screen of the LCD monitor 80.

Since the image data and the type of the adapter are recorded as a data unit of the data set in the main RAM 62, it is possible to shorten the time necessary to read the data from the main RAM 62.

Since the display permission command C1 and the execution permission command C2 are stored in the flash memory 68, the commands C1 and C2 are executed when the flash memory 68 is connected to the storage medium control section 64.

Accordingly, it is possible to easily issue the commands C1 and C2 to the CPU 65.

Since the substrate ID is stored in the flash memory 68, only when the substrate ID is identical to the unique substrate ID stored in the ROM 61, are the commands C1 and C2 executed.

Accordingly, it is possible to prevent the commands C1 and C2 from being executed by another endoscope apparatus having a different substrate ID.

The preferred examples of the invention have been hitherto described, but the invention is not limited to these examples. Addition, omission, replacement, and various other modifications of the configuration may be made without departing from the technical scope of the invention.

For example, in the previously discussed embodiment, the adapter type, which is one of the items of condition information relating to the test condition of the subject, is selected as data which is stored in association with the image data.

However, the data stored in association with the image data is not limited to the adapter type data. For example, it may be possible to appropriately select and use the subject information relating to the subject such as the temperature of the subject surface, the condition information such as the type of the LED used, the operating time and the temperature of the LED, and the light-on state of the LED, the identification information such as the name of the operator, and the like.

As described above, the test information, which corresponds to at least any one of the condition information and the subject information, can be stored in the main RAM 62 in association with the image data.

Further, in the embodiment, only when the identification program P2 is set to the display permission state, is the type of the adapter displayed in the area A4 of the LCD monitor 80. Accordingly, when the identification program P2 is set to the display restriction state, the setting is made so as to display nothing in the area A4.

However, for example, when the identification program P2 is set to the display permission state, the setting may be made so as to display the type of the adapter in the area A4. In addition, when the identification program P2 is set to the display restriction state, the setting may be made so as to display a message, which represents that execution of the adapter type display function is restricted, to the effect that "the adapter type display function is currently not executable".

With such a configuration, even when the identification program P2 is set to the display restriction state, it is possible to make the operator more clearly recognize that the endoscope apparatus 1 can be set so as to be able to execute the adapter type display function. As a result, it is possible to assist the operator to activate the adapter type display function.

In addition, the message to the effect that "the adapter type display function is currently not executable" may be displayed so that a difference in contrast between the message and the background of the LCD monitor 80 is set to be smaller than that of the display of the adapter type.

For example, when the background of the LCD monitor 80 is white, the adapter type is indicated by a black color, the characters thereof are indicated by a grey color.

In the embodiment, the image data and the adapter type data are stored as the data set in the main RAM 62.

However, there may be only several adapter types, the character string representing the adapter types may be long, or the operator may rarely exchange the adapter. In this case, by recording the address at which the adapter type is recorded in the main RAM 62 instead of the adapter type in the data set, the data set may be configured to be associated with the address at which the adapter type is recorded in the main RAM 62.

With such a configuration, it is possible to reduce the volume of the data set stored in the main RAM 62.

In addition, in the embodiment, the flash memory 68 stores two commands of the display permission command C1 for the identification program P2 and the execution permission command C2 for the light amount increase program P4. Accordingly, when the flash memory 68 is connected to the USB terminal 53, the two commands are set to be executed.

However, the number of the commands stored in the flash memory 68 is not limited, and it is preferable that the flash memory 68 should store one or more commands corresponding to at least any one of the display permission command and the execution permission command.

In the embodiment, the restriction section is the flag RAM 63.

However, the restriction section is not limited to this. For example, the restriction section may be a program that restricts the execution and the display of the above-mentioned programs P1 to P4, and may be a program that puts the programs P1 to P4 or the like to the execution permission state and the display permission state by restricting the execution of the restriction program based on the above-mentioned execution permission command and display permission command.

Further, each permission command may also be stored in a unit such as a processing tool connected to the endoscope apparatus 1 instead of the flash memory 68. Thus, each permission command may be executed when the unit is mounted on the endoscope apparatus 1.

In the exemplary embodiment, each permission command is stored in the flash memory 68, and thus each permission command is executed when the flash memory 68 is connected to the storage medium control section 64. However, the permission command may be issued by operations of the joystick 32 or the like of the operation section 30.

In addition, in the exemplary embodiment, the nondestructive testing system comprises an endoscope apparatus. However, the testing system is not limited to the endoscope apparatus, and may be an eddy-current flaw detection apparatus or an ultrasonic flaw detection apparatus, or any other detection apparatus.

Still further, the permission commands may be communicated to the endoscope apparatus 1 or other detection apparatus via the Internet or other communication network, such as a Local Area Network or wireless network.

While preferred embodiments of the invention have been described and illustrated above, it should be understood that these are exemplary of the invention and are not to be considered as limiting. The invention is not to be considered as limited to the above description, and may be limited only by the technical scope of the appended claims.

What is claimed is:

1. A nondestructive testing apparatus comprising:
a display section;
a storage section which is configured to store a plurality of predetermined functions which are executable by the nondestructive testing apparatus, wherein (i) each of the predetermined functions is initially set to one of a permitted state and a disabled state, and (ii) each of the predetermined functions is initially set to one of a display state and a non-display state on the display section, wherein the display state or the non-display state is set independently of the permitted state or the disabled state, such that each of the predetermined functions is capable of selectively being set to any of (i) the permitted state and the display state, (ii) the permitted state and the non-display state, (iii) the disabled state and the display state, and (iv) the disabled state and the non-display state, and wherein in an initial state at least one of the predetermined functions is set to the disabled state and the non-display state; and a controller which is configured to receive permission information including information which: (i) unlocks at least one of the predetermined functions initially set to the disabled state so as to be set to the permitted state, and (ii) unlocks at least one of the predetermined functions initially set to the non-display state so as to be set to the display state;

wherein the controller is configured to control the display section so as to display an operation icon on the display section only with respect to all of the predetermined functions which are set to the display state, including any of the predetermined functions which is set to the disabled state and the display state.

2. The nondestructive testing apparatus according to claim 1, wherein the storage section is configured to further store an apparatus identifier which is unique to the nondestructive testing apparatus.

3. The nondestructive testing apparatus according to claim 2, wherein the controller is configured to unlock the at least one predetermined function when the apparatus identifier stored in the storage section matches a received apparatus identifier included in the permission information.

4. The nondestructive testing apparatus according to claim 1, wherein the controller is configured to receive the permission information from a detachably connected storage medium having the permission information stored thereon.

5. The nondestructive testing apparatus according to claim 1, wherein the controller is configured to control the display section so as to display an invitation icon on the display section when one of the predetermined functions which is requested by a user is set to the disabled state.

6. A nondestructive testing apparatus comprising:
a display section;
an image capturing section;
a storage section which is configured to store a plurality of predetermined functions which are executable by the nondestructive testing apparatus, wherein each of the predetermined functions is initially set to one of a display state and a non-display state on the display section, and wherein in an initial state at least one of the predetermined functions is set to the non-display state; and
a controller which is configured to receive permission information including information which unlocks at least one of the predetermined functions initially set to the non-display state so as to be set to the display state;
wherein the storage section is further configured to store additional information at a time of capturing an image by the image capturing section, the additional information being stored in a related manner with the captured image; and
wherein the additional information comprises information relating to all of the predetermined functions executed at the time of capturing the image, including information relating to any of the predetermined functions executed at the time of capturing the image and set to the non-display state.

7. The nondestructive testing apparatus according to claim 6, wherein the controller is configured to control the display section so as to display the additional information in combination with the related captured image on the display section only with respect to respective ones of the predetermined functions set to the display state.

8. A non-transitory computer-readable medium having a program stored thereon for controlling a nondestructive testing apparatus to perform functions comprising:
storing a plurality of predetermined functions which are executable by the nondestructive testing apparatus, wherein (i) each of the predetermined functions is initially set to one of a permitted state and a disabled state, and (ii) each of the predetermined functions is initially set to one of a display state and a non-display state on a display section, wherein the display state or the non-display state is set independently of the permitted state or the disabled state, such that each of the predetermined functions is capable of selectively being set to any of (i) the permitted state and the display state, (ii) the permitted state and the non-display state, (iii) the disabled state and the display state, and (iv) the disabled state and the non-display state, and wherein in an initial state at least one of the predetermined functions is set to the disabled state and the non-display state; and
receiving permission information including information which: (i) enables unlocking of at least one of the predetermined functions initially set to the disabled state so as to be set to the permitted state, and (ii) enables unlocking of at least one of the predetermined functions initially set to the non-display state so as to be set to the display state; and
displaying an operation icon only with respect to all of the predetermined functions which are set to the display state, including any of the predetermined functions which is set to the disabled state and the display state.

9. The computer-readable storage medium according to claim 8, wherein the program controls the nondestructive testing apparatus to store an apparatus identifier which is unique to the nondestructive testing apparatus.

10. The computer-readable storage medium according to claim 9, wherein the program controls the nondestructive testing apparatus to perform the unlocking when the stored apparatus identifier matches a received apparatus identifier included in the permission information.

11. The computer-readable storage medium according to claim 8, wherein the program controls the nondestructive testing apparatus to receive permission information from a detachably connected storage medium having the permission information stored thereon.

12. The computer-readable storage medium according to claim 8, wherein the program controls the nondestructive testing apparatus to display an invitation icon when one of the predetermined functions which is requested by a user is set to the disabled state.

13. A non-transitory computer readable medium having a program stored thereon for controlling a nondestructive testing apparatus including a display section and an image capturing section, the program controlling the nondestructive testing apparatus to perform functions comprising:
storing a plurality of predetermined functions which are executable by the nondestructive testing apparatus, wherein each of the predetermined functions is initially set to one of a display state and a non-display state on the display section, and wherein in an initial state at least one of the predetermined functions is set to the non-display state;
receiving permission information including information which unlocks at least one of the predetermined functions initially set to the non-display state so as to be set to the display state; and storing additional information at a time of capturing an image by the image capturing section, the additional information being stored in a related manner with the captured image;

wherein the additional information comprises information relating to all of the predetermined functions executed at the time of capturing the image, including information relating to any of the predetermined functions executed at the time of capturing the image and set to the non-display state.

14. The computer-readable storage medium according to claim 13, wherein the program controls the nondestructive testing apparatus to display the additional information in combination with the related captured image on the display section only with respect to respective ones of the predetermined functions set to the display state.

15. A nondestructive testing apparatus comprising:

an endoscope apparatus which includes: (i) an insertion section which has an elongated shape and includes a bending portion configured to be bent and a flexible tube portion connected to a proximal end of the bending portion; (ii) an operation section which is connected to a proximal end of the insertion section and is operable to perform a bending operation of the bending portion; and (iii) a main body unit which is connected to the operation section;

a display section;

a storage section which is configured to store a plurality of predetermined functions which are executable by the nondestructive testing apparatus, wherein (i) each of the predetermined functions is initially set to one of a permitted state and a disabled state, and (ii) each of the predetermined functions is initially set to one of a display state and a non-display state on the display section, wherein the display state or the non-display state is set independently of the permitted state or the disabled state, such that each of the predetermined functions is capable of selectively being set to any of (i) the permitted state and the display state, (ii) the permitted state and the non-display state, (iii) the disabled state and the display state, and (iv) the disabled state and the non-display state, and wherein in an initial state at least one of the predetermined functions is set to the disabled state and the non-display state; and a controller which is configured to receive permission information including information which: (i) unlocks at least one of the predetermined functions initially set to the disabled state so as to be set to the permitted state, and (ii) unlocks at least one of the predetermined functions initially set to the non-display state so as to be set to the display state;

wherein the controller is configured to control the display section so as to display an operation icon on the display section only with respect to all of the predetermined functions which are set to the display state, including any of the predetermined functions which is set to the disabled state and the display state.

16. A nondestructive testing apparatus comprising:

an endoscope apparatus which includes: (i) an insertion section which has an elongated shape and includes a bending portion configured to be bent and a flexible tube portion connected to a proximal end of the bending portion; (ii) an operation section which is connected to a proximal end of the insertion section and is operable to perform a bending operation of the bending portion; and (iii) a main body unit which is connected to the operation section;

a display section;

an image capturing section;

a storage section which is configured to store a plurality of predetermined functions which are executable by the nondestructive testing apparatus, wherein each of the predetermined functions is initially set to one of a display state and a non-display state on the display section, and wherein in an initial state at least of the predetermined functions is set to the non-display state; and a controller which is configured to receive permission information including information which unlocks at least one of the predetermined functions initially set to the non-display state so as to be set to the display state;

wherein the storage section is configured to store additional information at a time of capturing an image by the image capturing section, the additional information being stored in a related manner with the captured image; and wherein the additional information comprises information relating to all of the predetermined functions executed at the time of capturing the image, including information relating to any of the predetermined functions executed at the time of capturing the image and set to the non-display state.

* * * * *